United States Patent Office 3,165,526
Patented Jan. 12, 1965

3,165,526
SPIRO INDOLO QUINOLIZINES
Johan Gootjes, Heer Hugowaard, Netherlands, assignor to N.V. Koninklijke Pharmaceutische Fabrieken v/h Brocades Stheeman en Pharmacia, Amsterdam, Netherlands, a corporation of the Netherlands
No Drawing. Filed July 18, 1963, Ser. No. 296,085
Claims priority, application Great Britain, Oct. 9, 1962, 38,281/62
9 Claims. (Cl. 260—293)

This invention relates to new therapeutically useful indoloquinolizines and their acid addition salts, to a process for their preparation and pharmaceutical compositions containing them.

According to the present invention, there are provided the new indolo-quinolizines of the general formula:

(I)

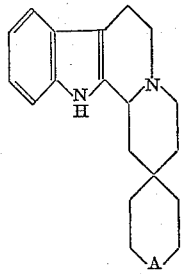

wherein A represents a straight or branched lower alkylene chain, one or two carbon atoms of which form part of the ring system, or a lower alkylimine, arylimine or arylalkylimine grouping. More particularly, the radicals represented by the symbol A are

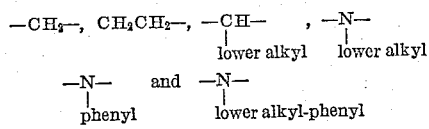

The lower alkyl groups are straight or banched chain groups such as methyl (which is preferred), ethyl, propyl, isopropyl, butyl, isobutyl, t-butyl, amyl and the like. The phenyl-lower alkyl groups include, benzyl, phenethyl and the like.

The aforesaid new indolo-quinolizines are therapeutically active compounds which are useful as sedatives. When used for therapeutic purposes they may be employed as such or in the form of physiologically acceptable non-toxic acid addition salts, i.e., salts, which are not harmful to the animal organism when used in therapeutic doses, derived from inorganic acids such as the hydrohalic acids (e.g. hydrochloric and hydrobromic acids), and organic acids such as maleic, tartaric, citric, fumaric, and succinic acids. Preferred compounds are those of Formula I in which A represents —CH$_2$— or N—CH$_3$, and their non-toxic acid addition salts.

The invention includes within its scope pharmaceutical preparations containing one or more of the therapeutically active compounds of Formula I, or non-toxic acid addition salts thereof, in association with a physiologically acceptable carrier. The preparations may take any of the forms customarily employed for administration of therapeutically active substances but the preferred types are those suitable for oral administration and especially tablets, pills, and capsules including the substance. The tablets and pills may be formulated in conventional manner with one or more physiologically acceptable diluents or excipients such as lactose or starch, and include materials of a lubricating nature such as calcium stearate. Capsules made of absorbable material, such as gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, such as liquid paraffin, or a syrup or elixir base. The active substance may also be made up in a form suitable for parenteral administration, i.e. as a suspension or emulsion in sterile water or an organic liquid usually employed for injectable preparations, for example vegetable oil such as olive oil, or a sterile solution in an organic solvent.

According to a feature of the present invention, the indoloquinolizines of Formula I are prepared by the process which comprises reducing the carbonyl of a compound of the formula:

(II)

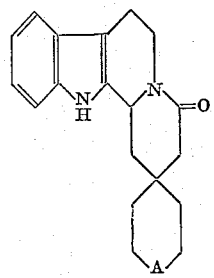

(wherein A is as hereinbefore defined) to the methylene (i.e. —CH$_2$—) group. Preferably reduction of the carbonyl group is effected by means of lithium aluminum hydride, with the reagents in an inert organic solvent medium.

The starting materials of Formula II may be prepared by reacting a ketone of the formula:

(III) 

with ethyl cyanoacetate and hydrolyzing the resultant product to obtain a diacetic acid compound of the formula:

(IV) 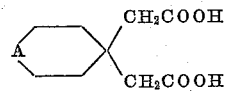

converting the diacetic acid compound into its anhydride by, for example, refluxing with acetic anhydride, reacting the diacetic anhydride with tryptamine (preferably in an organic solvent, e.g. benzene or dioxane, or aqueous organic solvent medium) to obtain an acid-amide of the formula:

(V)

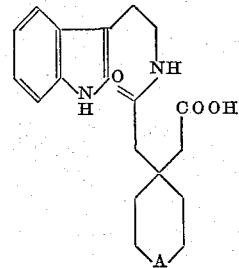

or an acid addition salt thereof, converting the acid-amide to its methyl ester (preferably by the action of diazomethane on the free base), cyclizing the methyl ester, using for example the Bischler-Napieralski reaction (Org. Reactions VI, 74–150) involving employment of phosphorus oxychloride, to obtain a compound of the formula:

(VI)
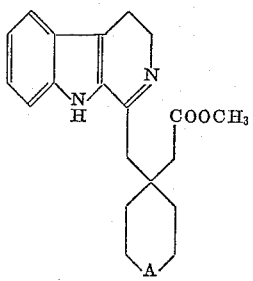

or (VII)
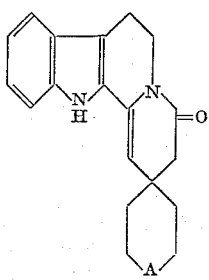

and hydrogenating the double bond in the six-membered nitrogen-containing ring, for example by catalytic hydrogenation using Adams' platinum oxide catalyst, and followed by ring closure of the hydrogenated product obtained from a compound of Formula VI and having the formula:

(VIII)
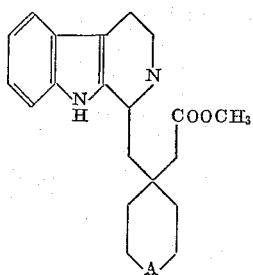

The ring closure may be effected in an organic solvent medium with or without heating.

By the aforesaid process steps starting materials of Formula II are obtained.

The following examples illustrate the invention:

EXAMPLE I

1′,2′,3′,4′,6′,7′,12′,12b′-Octahydro-Spiro(Cyclohexane-1,2′-Indolo[2,3-a]Quinolizine)

1,1-cyclohexane diacetic anhydride is prepared from cyclohexanone and ethyl cyanoacetate according to the method of A. I. Vogel [J. Chem. Soc. (1934), 1758]. The intermediate cyclohexane-1,1-diacetic acid is converted into the anhydride by refluxing 30 g. of the acid with 50 ml. of acetic acid and 150 ml. of acetic anhydride for a period of three hours. Acetic acid and the remainder of the acetic anhydride are then removed by distillation. The 1,1-cyclohexane diacetic anhydride is obtained by distillation under reduced pressure; boiling point 126° C./0.5 mm.; melting point about 68–69° C.

15 g. of tryptamine dissolved in 175 ml. of warm benzene is added dropwise to 17 g. of 1,1-cyclohexane diacetic anhydride dissolved in benzene. The oily precipitate crystallizes on cooling and yields 30 g. of N-(β-indolyl-ethyl)cyclohexane-1-acetic acid-1-acetamide (93%). The product melts at about 149.5–150.5° C. after crystallization from methanol.

12 g. of the acetamide, dissolved in ether to which a small amount of methanol is added, is esterified with an ethereal solution of diazomethane. The ether is removed by distillation and a solution of 30 ml. of freshly distilled phosphorus oxychloride in 50 ml. of benzene is added. The solution is boiled under reflux for two hours and benzene and surplus phosphorus oxychloride are removed by distillation under reduced pressure. The residue is treated with methanol and then with a cold solution of potassium carbonate in water, followed by an extraction with ether. The ethereal solution is dried and, after filtration, concentrated. To the residue some methanol is added. After boiling under reflux for two hours, 7.2 g. of 2′,3′,4′,6′,7′,12′-hexahydro-spiro(cyclohexane-1,2′-indolo[2,3-a]quinolizin-4′-one) are obtained. The product melts at about 239° C. after crystallization from propanol or dioxane.

Analysis.—Calculated for $C_{20}H_{22}N_2O$: C, 78.40%; H, 7.24%; N, 9.15%. Found: C, 78.5%; H, 7.5%; N, 8.8%.

6.2 g. of 2′,3′,4′,6′,7′,12′-hexahydro-spiro(cyclohexane-1,2′-indolo[2,3-a]quinolizin-4′-one) is dissolved in methanol and ethyl acetate. Hydrogenation is effected with the aid of 150 mg. of platinum oxide catalyst (Adams' catalyst). After the removal by filtration of the catalyst and distillation of the solvent, 5.5 g. of crystalline 1′,2′,3′,4′,6′,7′,12′,12b′-octahydro-spiro(cyclohexane-1,2′-indolo[2,3-a]quinolizin-4′-one) is obtained. The compound melts at about 246° C. (decomposition) after crystallization from dioxane and acetone.

Analysis.—Calculated for $C_{20}H_{24}N_2O$: C, 77.8%; H, 7.84%; N, 9.09%. Found: C, 77.0%; H, 7.5%; N, 9.6%.

5 g. of 1′,2′,3′,4′,6′,7′,12′,12b′-octahydro-spiro(cylohexane-1,2′-indolo[2,3-a]quinolizin-4′-one) is reduced with lithium aluminum hydride. The desired compound, 1′,2′,3′,4′,6′,7′,12′,12b′-octahydro-spiro(cyclohexane-1,2′-indolo[2,3-a]quinolizine), is obtained in 85% yield. The free base can be crystallized from methanol, and the hydrochloride from a mixture of methanol with a little water. The hydrochloride has a melting point of 340° C. when determined in vacuo.

Analysis—Calculated for $C_{20}H_{27}ClN_2$: C, 72.59%; H, 8.22%; N, 8.46%. Found: C, 72.6%; H, 8.0%; N, 8.4%.

EXAMPLE II

1′,2′,3′,4′,6′,7′,12′,12b′-Octahydro-1-Methyl-Spiro (Piperidine-4,2′-Indolo[2,3-a]Quinolizine)

The preparation of diethyl 1-methyl-4,4-piperidine diacetate from 1-methylpiperid-4-one and cyanacetamide has been described by S. M. McElvain and R. E. Lyle (J. Am. Chem. Soc. 72, 384 (1950)). In an analogous way the corresponding free acid is prepared. The hydrochloride, after being crystallized from ethanol, melts at about 229–235° C. (decomposition).

Analysis.—Calculated for $C_{10}H_{18}ClO_4N$: C, 47.72%; H, 7.21%; N, 5.57%. Found: C,48.12%; H, 7.24%; N,5.60%.

20 g. of 1-methyl-4,4′-piperidine diacetic acid as the hydrochloride is boiled under reflux with 150 ml. of acetic anhydride for a period of 4 hours. The mixture (containing undissolved anhydride) is concentrated and the residue crystallized from acetic acid. The hydrochloride of the anhydride is obtained in 89.5% yield. Its melting point is 229–235° C. (decomposition).

Analysis.—Calculated for $C_{10}H_{16}ClNO_3$: C, 51.39%; H, 6.90%. Found: C, 51.97%; H, 7.19%.

A mixture of about equal parts of the anhydride and of the acid gives a melting point depression of about 20° C.

0.1 mol. of tryptamine is reacted with 0.1 mol. of 1-methyl-4,4-piperidine diacetic anhydride in a solvent consisting of 10 parts of dioxane and 1 part of water. The condensation product, viz. N-[2-(3-indolyl)ethyl]-1-methylpiperidine-4,4-diacetic acid monoamide is obtained in 62.5% yield in the form of its hydrochloride after crystallization from a mixture of ethanol and ethylacetate; melting point of hydrochloride 196–197° C.

*Analysis.*—Calculated for $C_{20}H_{27}N_3O_3Cl$: C, 60.97%; H, 7.16%; N, 10.67%. Found: C, 60.86%; H, 7.20%; N, 10.50%.

The aforesaid monoamide salt is converted into the free base by treatment with sodium hydroxide. Thereafter, a solution of diazomethane in ether is slowly added to the N-[2-(3-indolyl)ethyl]-1-methylpiperidine-4,4-diacetic acid monoamide in a medium consisting of ether and methanol. Nitrogen is evolved and the yellow diazomethane color disappears while the methyl ester of the amide formed dissolves in the reaction mixture. Ether is removed by evaporation and the residue is heated under reflux with freshly distilled phosphorus oxychloride and anhydrous benzene, hydrogen chloride being evolved during the process. After removal of benzene and excess phosphorus oxychloride by distillation under reduced pressure, the residual phosphorus oxychloride is decomposed by addition of methanol with cooling. The reaction mixture is made alkaline and extracted several times with ether. Oxalic acid is added to the dried ethereal solution and the methyl 4-[3,4-dihydro-β-carbolin-1-yl)methyl]-1-methylpiperidine-4-acetate thus obtained is isolated by means of a fractional crystallization. The methyl acetate obtained is then reduced with hydrogen in the presence of a platinum oxide catalyst (Adams' catalyst) yielding methyl 4-[1,2,3,4-tetrahydro - β - carbolin-1-yl)methyl]-1-methylpiperidine-4-acetate.

The last mentioned compound is subjected to ring closure by heating it under reflux in xylene to give 1',2',3',4',6',7',12',12b'-octahydro - 1 - methyl-spiro(piperidine-4,2'-indolo[2,3-a]quinolizin-4'-one).

The ketone, dissolved in ether or tetrahydrofuran, is reduced with lithium aluminum hydride. The reaction mixture is heated under reflux for two hours. Excess lithium aluminum hydride is decomposed with a little water. The aluminum hydroxide formed is removed by filtration and washed with ether. After drying with sodium sulphate and filtration, the solvent is removed by distillation and the residual 1',2',3',3',4',6',7',12',12b'-octahydro - 1 - methyl-spiro(piperidine-4,2'-indolo[2,3-a]quinolizine) is purified by crystallization of the acid addition salt.

What is claimed is:

1. A compound of the formula

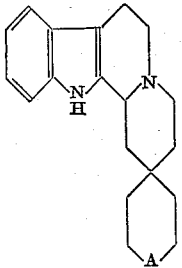

wherein A is a radical of the group consisting of

—CH$_2$—, —CH$_2$CH$_2$—, —CH—   , N
                        |           |
                     lower alkyl  lower alkyl —N—   , and  —NH
 |             |
phenyl      lower alkyl-phenyl and physiologically acceptable acid addition salts thereof.

2. A compound of the formula

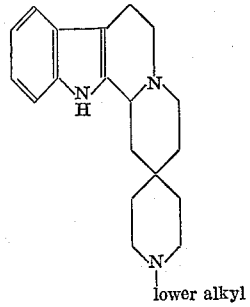

lower alkyl

3. A compound of the formula

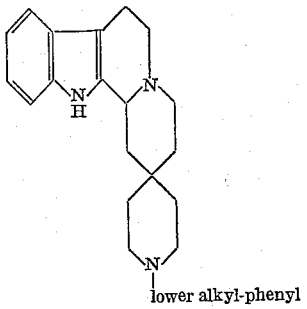

lower alkyl-phenyl 4. 1',2',3',4',6',7',12',12b' - octahydro - spiro(cyclohexane-1,2'-indolo[2,3-a]quinolizine).

5. The hydrochloride of the compound of claim 4.

6. 1',2',3',4',6',7',12',12b'-octahydro - 1 - methyl-spiro(piperidine-4,2'-indolo[2,3-a]quinolizine).

7. A compound of the formula

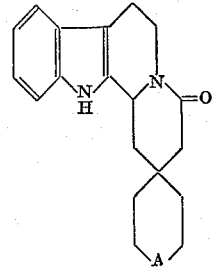

wherein A has the same meaning as in claim 1.

8. 1',2',3',4',6',7',12',12b' - octahydro - spiro(cyclohexane-1,2'-indolo[2,3-a]quinolizin-4'-one).

9. 1',2',3',4',6',7',12',12b'-octahydro - 1 - methyl-spiro(piperidine-4,2'-indolo[2,3-a]quinolizin-4'-one).

References Cited in the file of this patent

UNITED STATES PATENTS 2,809,201    Koelsch _____ Oct. 8, 1957